(12) United States Patent
Osuga (10) Patent No.: US 8,751,750 B2
(45) Date of Patent: Jun. 10, 2014

(54) CACHE DEVICE, DATA MANAGEMENT METHOD, PROGRAM, AND CACHE SYSTEM

(75) Inventor: Toru Osuga, Tokyo (JP)

(73) Assignee: NEC Corporation, Tokyo (JP)

(*) Notice: Subject to any disclaimer, the term of this patent is extended or adjusted under 35 U.S.C. 154(b) by 194 days.

(21) Appl. No.: 13/349,690

(22) Filed: Jan. 13, 2012

(65) Prior Publication Data

US 2012/0185650 A1 Jul. 19, 2012

(30) Foreign Application Priority Data

Jan. 17, 2011 (JP) ................................. 2011-006606

(51) Int. Cl.
*G06F 13/00* (2006.01)

(52) U.S. Cl.
USPC ............ 711/133; 711/100; 711/111; 711/104; 711/154; 711/160; 711/161; 711/162; 711/170; 711/113; 711/118; 711/171; 711/172; 711/135; 711/136; 711/143

(58) Field of Classification Search
USPC ......... 711/100, 111, 104, 154, 160, 161, 162, 711/170, 171, 172, 113, 118, 142, 143, 135, 711/136, 133
See application file for complete search history.

(56) References Cited

U.S. PATENT DOCUMENTS 5,835,940 A * 11/1998 Yorimitsu et al. ............ 711/112
2004/0088508 A1 * 5/2004 Ballard et al. ................. 711/162

FOREIGN PATENT DOCUMENTS

| JP | 2003-345709 A | 12/2003 |
| JP | 2004-005309 A | 1/2004 |
| JP | 2006-060631 A | 3/2006 |

* cited by examiner

*Primary Examiner* — Midys Rojas
(74) *Attorney, Agent, or Firm* — Sughrue Mion, PLLC (57) ABSTRACT

A deleted cache determining part determines a cache data which is to be deleted from a data storing part in a case where a sum of a data amount of a data which is recorded to the data storing part and a data amount of a cache data which is stored to the data storing part and a data amount of a buffer data which is stored to the storing part is equal to or more than a predetermined threshold, and an accumulated data control part deletes the cache data which is determined by the deleted cache determining part from the data storing part.

9 Claims, 5 Drawing Sheets

CACHE DEVICE, DATA MANAGEMENT METHOD, PROGRAM, AND CACHE SYSTEM

CROSS-REFERENCE TO RELATED APPLICATIONS

This application claims priority from Japanese Patent Application 2011-006606, which was filed on Jan. 17, 2011, in the Japanese Patent Office, the entire disclosure of which is incorporated by reference herein.

TECHNICAL FIELD

Illustrative embodiments relate to a cache device, a data management method, a program, and a cache system for temporarily storing data transmitted and received between a user terminal and a storage device.

BACKGROUND

In accordance with spreading computers and digitizing various kinds of information, both of a total amount and a value of digital data accumulated by a user have been increased. In recent years, in order to save the enormous and important data as a backup, and use the data from plural terminals, an online storage service of storing the data to a storage device which is connected to a user terminal via a network is spreading.

However, when the storage device responds to all of requests for transmitting data from user terminals, all of the exchange of the data is carried out by way of a network. Thereby, a load of the network is increased, a delay in response to each access is increased, and there is a concern that a user's experience is significantly deteriorated.

With regard to the concern, there has been worked out a resolution measure of improving the experience of a user by reducing a network load by connecting a cache device which stores a part of data requested by a user terminal to the user terminal directly or by way of a small-scaled network, and accumulating the data temporarily in the cache device.

When the user terminal receives data, as a method of accumulating the data by the cache device, there is present a cache system, and a data having a high possibility of being requested by a user is accumulated at a cache device by a method shown, for example, in Japanese Unexamined Patent Publication No. 2004-005309 (hereinafter "Patent Document 1"). According to Patent Document 1, a tendency of which data accesses are concentrated is calculated by analyzing an access log of a user terminal, and data are changed such that the data on which accesses are concentrated is accumulated in the cache device. Thereby, the cache device can respond to a number of requests for transmitting data from user terminals, and therefore, the load of the network can be reduced.

According to the method described in Patent Document 1, (popular) contents which can be looked at and listened to by a number of users are stored in a relay server in a service in which plural users look at and listen to images, and the method can divertedly be used also in a method of storing data which can repeatedly be used by a single user at a high frequency to a cache device.

Further, as a method of accumulating data by a cache device when data formed and edited by a user are transmitted, a buffer system or a batch processing is present, for example, data are accumulated, thereafter, transmitted by a method shown in, for example, Japanese Unexamined Patent Publication No. 2006-060631 (hereinafter "Patent Document 2"). According to Patent Document 2, there is provided a means for monitoring an amount of accumulated data such that the data is transmitted after a sufficient amount of data are stored at a transmission buffer part which relays data to be transmitted. Thereby, occurrence of overhead or wasteful retransmission which occurs by transmitting a small amount of data can be restrained, and an efficient data transmission can be carried out.

Further, Japanese Unexamined Patent Publication No. 2003-345709 (hereinafter "Patent Document 3") discloses a method of achieving high speed formation of a processing of writing data from a user terminal to a storage device, and achieving high speed formation of a processing of reading the data which are written to the storage device by the user terminal by using a cache device.

SUMMARY

In a case where an object is configured by both of a reduction in a load of a network by a request for receiving data from a user terminal and efficient formation of transmitting the data from the user terminal as in Patent Document 3, a cache device stores both of cache data which are a part of data stored by a storage device, and buffer data which are data to be written to the storage device at a storing part.

However, in a case of using a method described in Patent Document 3, a sufficient capacity cannot be ensured at the storing part. Therefore, when the buffer data cannot be written to the storing part, the cache device does not record the buffer data to the storing part but transfers the buffer data to the storage device as it is. Therefore, in a case where a data amount of the cache data stored by the cache device is large, and the buffer data cannot be stored, there poses a problem that the high speed formation of updating from the user terminal cannot be achieved.

An illustrative embodiment been carried out in order to address the above-described problem and is a cache device which temporarily stores a data transmitted and received between a user terminal and a storage device, the cache device characterized in including a data recording means for recording a cache data which is a part of a data which is stored to the storage device, and a buffer data which is a data which is written to the storage device at a storing part, a buffer transmitting means for transmitting the buffer data which is stored by the storing part to the storage device, a buffer deleting means for deleting the buffer data which is transmitted by the buffer transmitting means from the storing part, a deleted cache determining means for determining the cache data which is to be deleted from the storing part in a case where a sum of a data amount of the data which is recorded to the storing part and a data amount of the cache data which is stored to the storing part and a data amount of the buffer data which is stored to the storing part is equal to or more than a predetermined threshold, and a cache deleting means for deleting the cache data which is determined by the deleted cache determining means from the storing part.

Further, an illustrative embodiment comprises a data management method which uses a cache device of temporarily storing a data which is transmitted and received between a user terminal and a storage device, characterized in that a data recording means records a cache data which is a part of a data which is stored to the storage device, and a buffer data which is a data which is written to the storage device to a storing part, a buffer transmitting means transmits the buffer data which is stored to the storing part to the storage device, a buffer deleting means deletes the buffer data which is transmitted by the buffer transmitting means from the storing part, a deleted cache determining means determines the cache data which is to be deleted from the storing part in a case where a sum of a data amount of the data which is recorded to the storing part and a data amount of the cache data which is stored to the storing part and a data amount of the buffer data which is stored to the storing part is equal to or more than a predetermined threshold, and a cache deleting means deletes the cache data which is determined by the deleted cache determining means from the storing part.

Further, an illustrative embodiment comprises a program for making a cache device which temporarily stores a data which is transmitted and received between a user terminal and a storage device function as a data recording means for recording a cache data which is a part of a data which is stored to the storage device, and a buffer data which is a data which is written to the storage device, a buffer transmitting means for transmitting the buffer data which is stored to the storing part to the storage device, a buffer deleting means for deleting the buffer data which is transmitted by the buffer transmitting means from the storing part, a deleted cache determining means for determining the cache data which is to be deleted from the storing part in a case where a sum of a data amount of the data which is recorded to the storing part and a data amount of the cache data which is stored to the storing part and a data amount of the buffer data which is stored to the storing part is equal to or more than a predetermined threshold, and a cache deleting means for deleting the cache data which is determined by the deleted cache determining means from the storing part.

Further, an illustrative embodiment comprises a cache system which includes a storage device which stores a data, a user terminal which reads the data from the storage device and writes the data to the storage device, and a cache device which temporarily stores the data which is transmitted and received between the user terminal and the storage device, characterized in that the cache device includes a data recording means for recording a cache data which is a part of a data which is stored to the storage device, and a buffer data which is a data which is written to the storage device to a storing part, a buffer transmitting means for transmitting the buffer data which is stored to the storing part to the storage device, a buffer deleting means for deleting the buffer data which is transmitted by the buffer transmitting means from the storing part, a deleted cache determining means for determining the cache data which is to be deleted from the storing part in a case where a sum of a data amount of the data which is recorded to the storing part and a data amount of the data which is stored to the storing part and a data amount of the cache data which is stored to the storing part and a data amount of the buffer data which is stored to the storing part is equal to or more than a predetermined threshold, and a cache deleting means for deleting the cache data which is determined by the deleted cache determining means from the storing part.

According to an illustrative embodiment, the cache device deletes the cache data in the case where the sum of the data amount of the data which is recorded to the storing part, the data amount of the cache data which is stored to the storing part, and the data amount of the buffer data which is stored to the storing part is equal to or more than the predetermined threshold. That is, in a case where the data amount which is stored to the storing part is large, and a sufficient capacity cannot be ensured, the cache device deletes the cache data which is stored to the storing part. Thereby, the cache device can write the buffer data, and therefore, high speed formation of updating from the user terminal can be achieved.

BRIEF DESCRIPTION OF THE DRAWINGS

Reference will now be made in detail to illustrative embodiments with reference to the accompanying drawings, in which.

DETAILED DESCRIPTION OF ILLUSTRATIVE EMBODIMENTS

Figure 1:
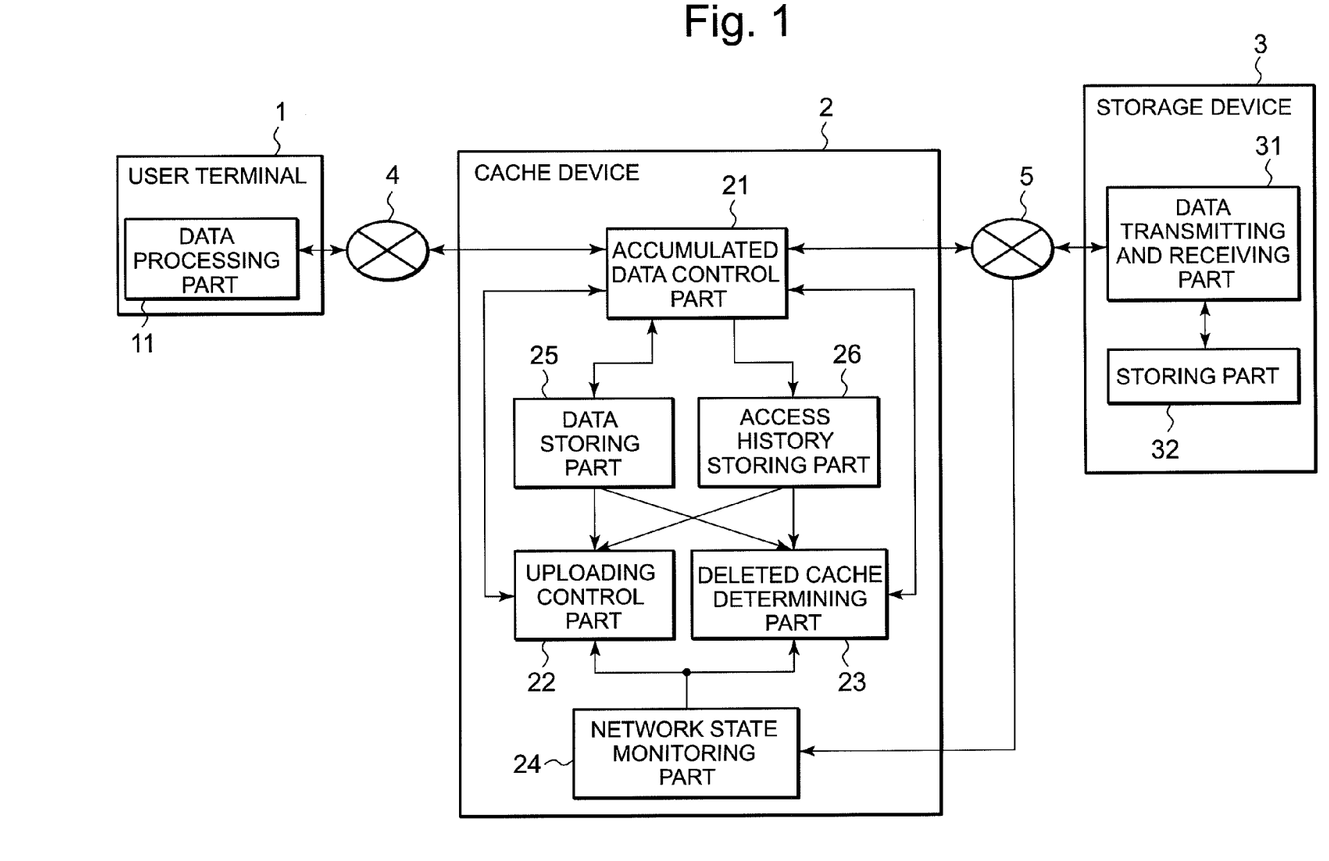
FIG. 1 is a block diagram showing a configuration of a first illustrative embodiment.

The above and/or other aspects will become more apparent by describing certain illustrative embodiments with reference to the accompanying drawings, in which:

FIG. 1 is a block diagram showing a configuration of a first illustrative embodiment.

In reference to FIG. 1, a cache system according to the first illustrative embodiment includes a user terminal 1, a cache device 2, and a storage device 3.

The user terminal 1 is a device which is operated by a user for using, reading, forming, and updating data as in, for example, a PC (Personal Computer) or the like.

The cache device 2 is connected to the user terminal 1 via a network 4, caches a data which is stored to the storage device 3 and transmits the data to the user terminal 1, and temporarily buffers a data which is formed and updated at the user terminal 1 and summarizingly transmits the data to an online storage device 33.

The storage device 3 is connected to the cache device 2 via a network 5, and stores a part or a total of data of a user.

Further, the network 4 is a network of connecting a narrow range at a vicinity of a user as in, for example, LAN (Local Area Network) in a building, an access network between a building and a base station or the like. Further, the network 5 is a network which is developed in a wide region as in, for example, the interne, NGN (Next Generation Network) or the like.

As shown in FIG. 1, the user terminal 1 includes a data processing part 11. The data processing part 11 receives an operation of using, reading, forming, and updating of data from a user, temporarily stores the data, and displays or forms and updates the data.

Specifically, when there is a request for using and reading a data from a user, the data processing part 11 requests for transmitting the data to the cache device 2. Further, when the data processing part 11 receives data from the cache device 2, the data processing part 11 temporarily stores the data to an internal memory and displays the data to the user. Further, when the data processing part 11 receives an operation of forming and updating the data from a user, the data processing part 11 forms and updates the data and stores the data to the internal memory. Further, when the data processing part 11 carries out a processing of preserving the data which is formed and updated by the user or a processing of finishing an application which is used in forming and updating the data, the data processing part 11 reads the data from the internal memory and transmits the data to the data cache device 2.

Further, the data processing part 11 is configured by, for example, CPU (Central Processing Unit).

Further, as shown in FIG. 1, the cache device 2 includes an accumulated data control part 21 (a data recording means, a buffer transmitting means, a buffer deleting means, a cache deleting means), an uploading control part 22 (a transmission determining means, a transmitted buffer determining means, a transmission rate determining means), a deleted cache determining part 23 (a deleted cache determining means), a network state monitoring part 24, a data storing part 25 (storing part), and an access history storing part 26.

The accumulated data control part 21 receives a request for transmitting data from the user terminal 1, acquires corresponding data from the data storing part 25 or the storage device 3, and transmits the data to the user terminal 1. At this occasion, the accumulated data control part 11 records the data to the data storing part 25 as cache data as necessary. Further, the accumulated data control part 21 receives the data from the user terminal 1, stores the data to the data storing part 25 as buffer data, and transmits the data to the storage device 3. Further, the accumulated data control part 21 deletes cache data which is determined by the deleted cache determining part 23 from the data storing part 25 when a storage capacity of the data storing part 25 is deficient. Further, when the accumulated data control part 21 executes these operations, the accumulated data control part 21 records times of the operations, meta-information of object data, and contents of the operations to the access history storing part 26 as a log.

The uploading control part 22 measures and collects information of a data amount of the buffer data which is stored to the data storing part 25 (hereinafter, described as transmitted buffer amount), a number of times of using the buffer data, a time period elapsed from a final access, as well as a load of the online storage device 33, a load of the network 5 and the like, and determines whether the buffer data is to be uploaded to the storage device 3 based on information of these. Further, when the uploading control part 22 determines to upload the buffer data, the uploading control part 22 determines a transmission rate when uploading is carried out.

The deleted cache determining part 23 measures and collects information of a size of the cache data which is stored to the data storing part 25, a frequency of using the cache data, as well as a delay time period and a band or the like of the network 5. Further, when the cache data is a time-varying image, the deleted cache determining part 23 collects information of a necessary bit rate of the cache data as well. Further, the deleted cache determining part 23 determines which cache data is to be deleted in a case where a data amount of the buffer data and a data amount of the cache data which are stored to the data storing part 25 are equal to or more than a predetermined threshold based on information of these.

The network state monitoring part 24 measures and collects information of the network 5 of a delay time period, a band, as well as a load of other communication traffic or the like of the network 5.

The data storing part 25 stores data which are received for using and reading by a user as cache data, and stores data which are formed and updated by the user for transmitting the data to the storage device 3 as buffer data.

The access history storing part 26 stores time at which the user carries out an operation, meta-information of a data which is an object of the operation, contents of an operation and the like as a log.

Further, as shown by FIG. 1, the storage device 3 includes a data transmitting and receiving part 31, and a storing part 32.

The data transmitting and receiving part 31 receives a request for transmitting data from the cache device 2, reads corresponding data from the storing part 32, and transmits the corresponding data to the cache device 2. Further, the data transmitting and receiving part 31 receives a notice of uploading data from the cache device 2, determines whether the uploading is to be received based on a load of the storage device and a time period elapsed from time at which uploading of data is carried out finally from the cache device 2 (hereinafter, described as uploading standby time) and the like, and notices the uploading to the cache device 2. Further, the data transmitting and receiving part 31 receives data from the cache device 2 and records the data to the storing part 32.

The storing part 32 stores a part or a total of data which is owned by a user.

Next, an explanation will be given of an operation of a cache system according to the embodiment.

First, an explanation will be given of an operation of receiving data by the user terminal 1 when a user uses and reads the data.

Figure 2:
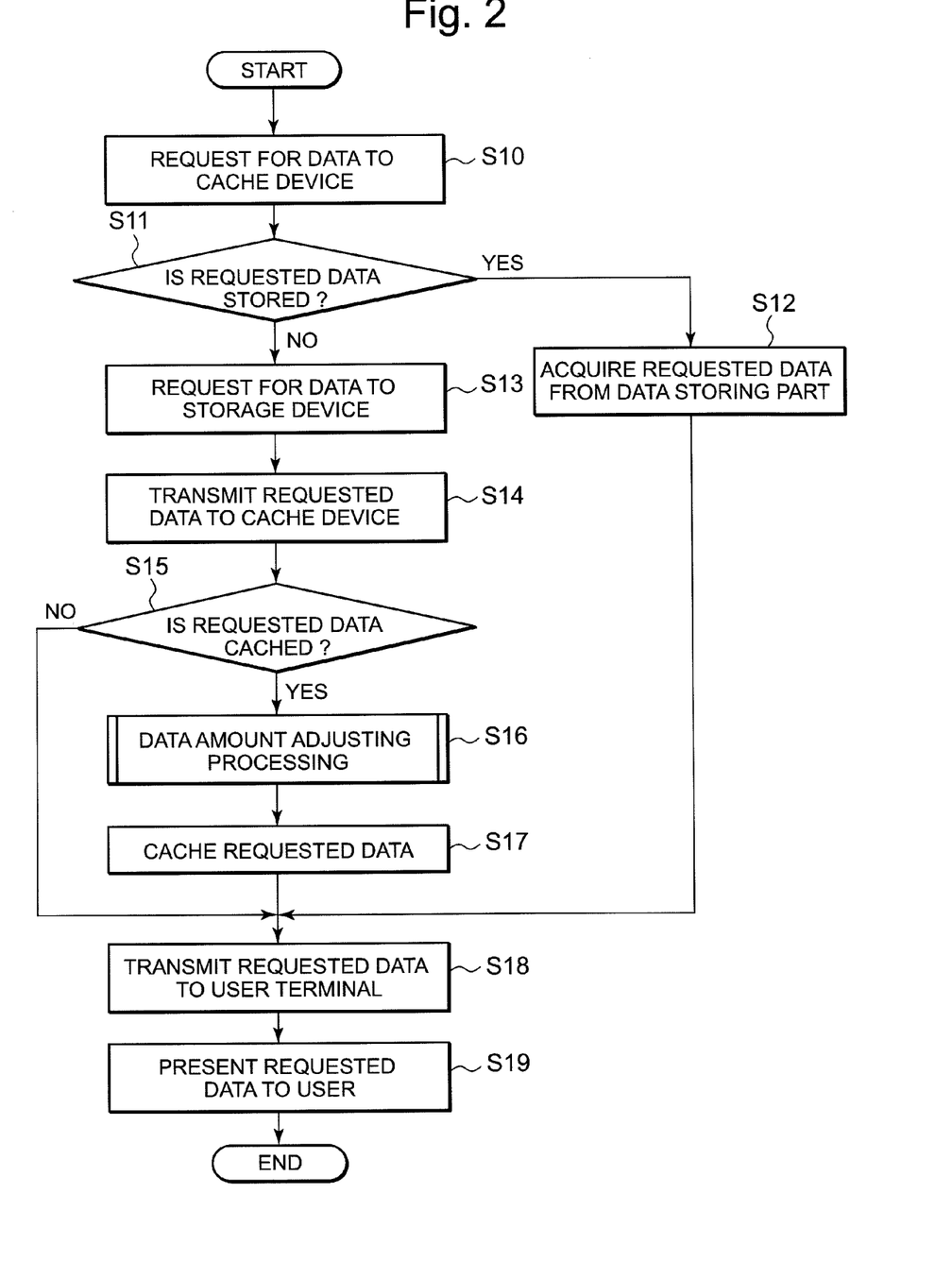
FIG. 2 is a flowchart showing an operation of receiving data by a user terminal when a user uses and reads the data according to an illustrative embodiment.

FIG. 2 is a flowchart showing an operation of receiving data by the user terminal 1 when a user uses and reads the data.

First, when a user inputs a request for using and reading data to the user terminal 1, the data processing part 11 of the user terminal 1 transmits a request for transmitting the data to the cache device 2 (step S10). When the user terminal 1 transmits the request for transmitting the data, the accumulated data control part 21 of the cache device 2 receives the request for transmitting the data, and confirms whether a corresponding data is present at the data storing part 25 (step S11). In a case where the corresponding data is determined to be present at the data storing part 25 (step S11: YES), the accumulated data control part 21 acquires the corresponding data from the data storing part 25 (step S12).

On the other hand, in a case where the corresponding data is determined to be not present at the data storing part 25 (step S11: NO), the accumulated data control part 21 transmits the request for transmitting the data to the storage device 3 (step S13). When the cache device 2 transmits the request for transmitting the data, the data transmitting and receiving part 31 of the storage device 3 receives the request for transmitting the data, acquires the data indicated by the transmission request from the storing part 32, and transmits the data to the cache device 2 (step S14).

When the storage device 3 transmits the data, the accumulated data control part 21 of the cache device 2 receives the corresponding data, and determines whether the data is recorded to the data storing part 25 as cache data (step S15). Further, as a method of determining whether the cache data is to be stored, a method of determining that all of the cache data is to be stored, a method of storing the cache data at random by a predetermined probability, a method of determining whether the cache data is to be stored by a file type, a method of determining whether the cache data is to be determined at random by a probability individually set according to the file type, or the like can be used.

In a case where the accumulated data control part 21 determines to record the data as cache data (step S15: YES), the cache device executes a data amount adjusting processing (step S16). The data amount adjusting processing is a processing of adjusting a data amount such that the data amount stored to the data storing part 25 does not become excessively large.

Here, an explanation will be given of the data amount adjusting processing.

Figure 3:
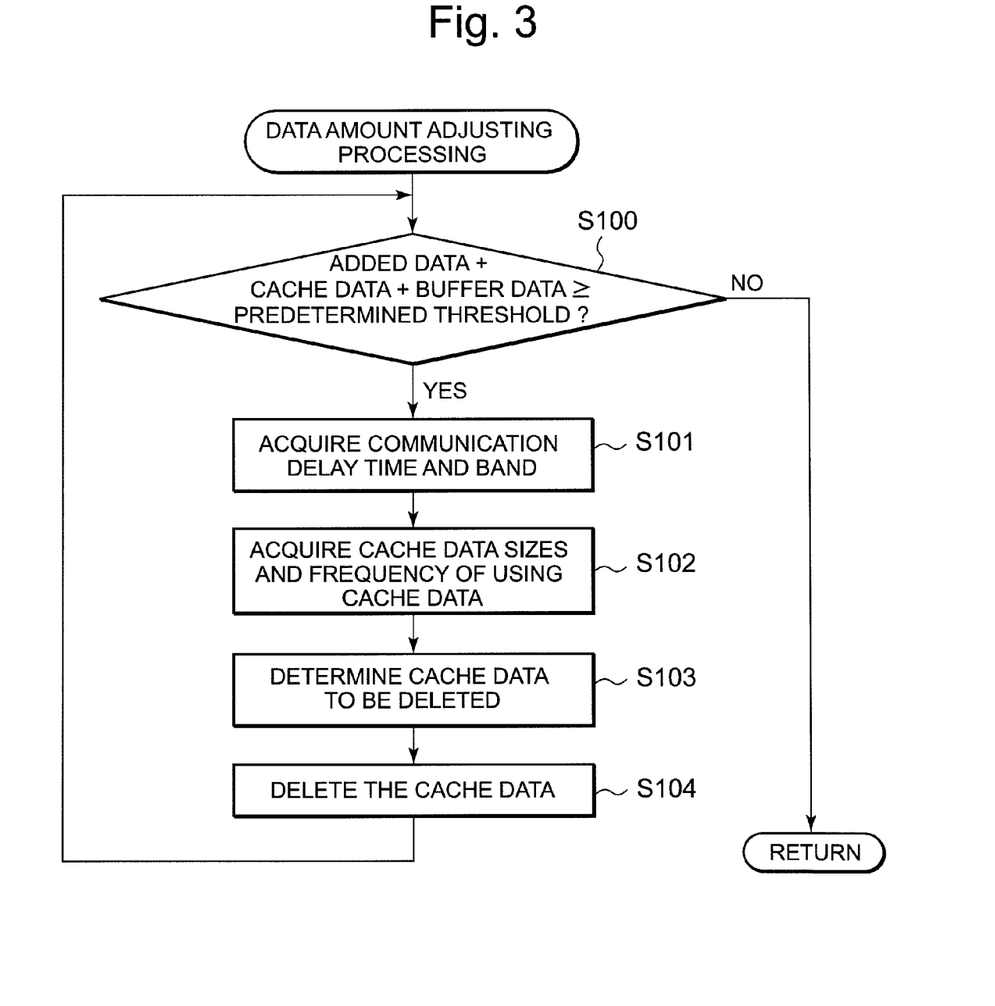
FIG. 3 is a flowchart showing a procedure of a data amount adjusting processing according to an illustrative embodiment.

FIG. 3 is a flowchart showing a procedure of the data amount adjusting processing.

First, the accumulated data control part 21 of the cache device 2 determines whether a value of adding the data amount of the data which is going to be recorded to the data storing part 25, a data amount of a cache data which is stored to the data storing part 25, and a data amount of a buffer data which is stored to the data storing part 25 exceeds a predetermined threshold (for example, a maximum storage capacity of the data storing part 25) (step S100).

In a case where the accumulated data control part 21 determines that a total sum of the data which is going to be recorded to the data storing part 25 and the data amount of the data which is stored to the data storing part 25 is equal to or more than the predetermined threshold (step S100: YES), the deleted cache determining part 23 acquires communication delay time (Round Trip Time) and a band of the network 5 from the network state monitoring part 24 (step S101). Further, the deleted cache determining part 23 acquires respective sizes of cache data which are stored to the data storing part 25, and acquires frequencies of using respective cache data from the access history storing part 26 (step S102).

Further, the deleted cache determining part 23 determines cache data to be deleted based on information which is acquired at steps S102, and S103, and notices the cache data to be deleted to the accumulated data control part 21 (step S103). Further, as a method of determining the cache data to be deleted, although various methods can be pointed out, for example, a method of calculating a predicted response time Re of each cache data by using Equation (1) shown below, and determining cache data in which a value indicated by Equation (2) is the lowest from respective cache data as an object of deletion is used.

$$Re = RTT + S/BW \quad (1)$$

$$F \times Re/Rr \quad (2)$$

where, notation RTT designates communication delay time at the network 5. Further, notation BW designates a band of the network 5. Further, notation S designates a size of cache data. Further, notation F designates a frequency of using cache data. Further, notation Rr designates response time which is calculated for every file type which is previously set.

Further, the method of determining the cache data to be deleted is not limited to the determining method described above, but, for example, there may be used a method of determining an object of deletion by cache data in which Re≤Rr and which has the lowest in the frequency F of using cache data.

Further, when a cache data is a time-varying image, there may be used a method of determining an object of deletion by cache data in which a necessary bit rate is designated by notation BR and BW≥BR and which has the lowest frequency F of using cache data. Further, in a case where cache data in which BW≥BR is not present, a frequency F of using cache data in which BW<BR is multiplied by a predetermined magnification of X which is a value equal to or more than 1 (in a case where cache data is not a time-varying image, the magnification is not multiplied), and an object of deletion is determined by cache data in which the value is the lowest. Further, the predetermined magnification X may be a fixed value, or may be a value which is changed in accordance with a size of BR. In a case where the predetermined magnification X is changed in accordance with the size of BR, it is preferable that the larger the BR, the larger the magnification X.

When the deleted cache determining part 23 determines cache data which is an object of deletion at step S103, the accumulated data control part 21 deletes the cache data which is the object of deletion from the data storing part 25 (step S104). Further, in a case where cache data which is an object of deletion is a time-varying image, instead of deleting all of the cache data, the accumulated data control part 21 may leave cache data at a front part which is burstingly needed in streaming reproduction, and delete only a remaining part. When the cache data is deleted, the operation returns to step S100, and carries out the determination of whether a total sum of data amounts of data which is going to be recorded to the data storing part 25 and data which is stored to the data storing part 25 exceeds a predetermined threshold.

At step S100, in a case where the accumulated data control part 21 determines that a total sum of the data amounts of the data which is going to be recorded to the data storing part 25 and the data which is stored to the data storing part 25 is less than the predetermined threshold (step S100: NO), it is determined that it is not needed to adjust the data amounts, and the data amount adjusting processing is finished.

When the cache device 2 has executed the data amount adjusting processing, the accumulated data control part 21 records the data received from the storage device 3 to the data storing part 25 as cache data (step S17).

In a case where a data is read from the data storing part 25 at step S12, in a case where the data is determined not to be recorded as a cache data at step S15 (step S15: NO), or in a case where the data is recorded to the data storing part 25 at step S17, the accumulated data control part 21 transmits the data indicated by a request for transmitting data which is received from the user terminal 1 to the user terminal 1 (step S18). When the cache device 2 transmits the data to the user terminal 1, the data processing part 11 of the user terminal 1 receives the data and presents the data to the user (step S19).

Next, an explanation will be given of an operation of transmitting data to the cache device 2 by the user terminal 1 when a user transmits formed and updated data.

Figure 4:
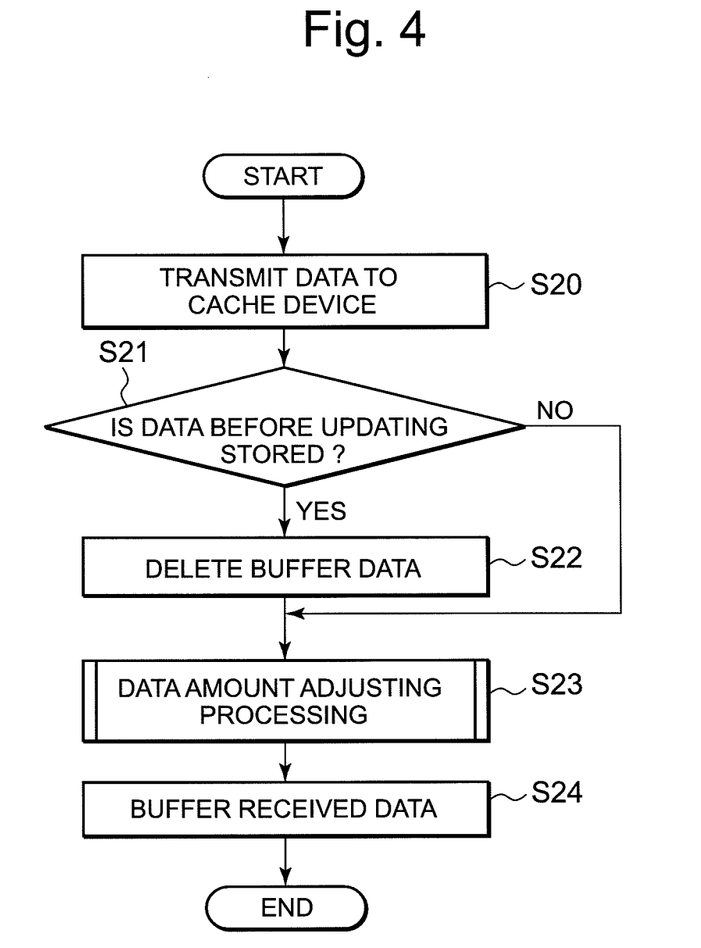
FIG. 4 is a flowchart showing an operation of transmitting data to a cache device by the user terminal when the data which are formed and updated by a user are transmitted according to an illustrative embodiment.

FIG. 4 is a flowchart showing an operation of transmitting data to the cache device 2 by the user terminal 1 when a user transmits the foamed and updated data.

The data processing part 11 of the user terminal 1 forms and updates data and records the data to the internal memory when the data processing terminal 1 receives an operation of forming and updating the data from a user. Further, when the user carries out a processing of preserving the data or a processing of finishing an application which is used in forming and updating the data, the data processing part 11 reads the data from the internal memory and transmits the data to the cache device 2 (step S20).

The accumulated data control part 21 of the cache device 2 determines whether data before updating the data received from the user terminal 1 by the data storing part 25 is stored at the data storing part 25 as buffer data (step S21). The determination of whether the data before updating is stored as the buffer data may be determined by, for example, whether buffer data indicating pass information the same as the pass information of the data of an object of updating is present. In a case where the data before updating is stored (step S21: YES), the accumulated data control part 21 deletes the buffer data (step S22).

In a case where the data storing part 25 does not store the data before updating (step S21: NO), or in a case where the buffer data is deleted at step S22, the cache device 2 executes the data amount adjusting processing described above (step S22). When the cache device 2 executes the data amount adjusting processing, the accumulated data control part 21 records the data received from the user terminal 1 to the data storing part 25 as the buffer data (step S23).

Next, an explanation will be given of an operation of transmitting the data which is formed and updated by the user to the storage device 3 by the cache device 2.

Figure 5:
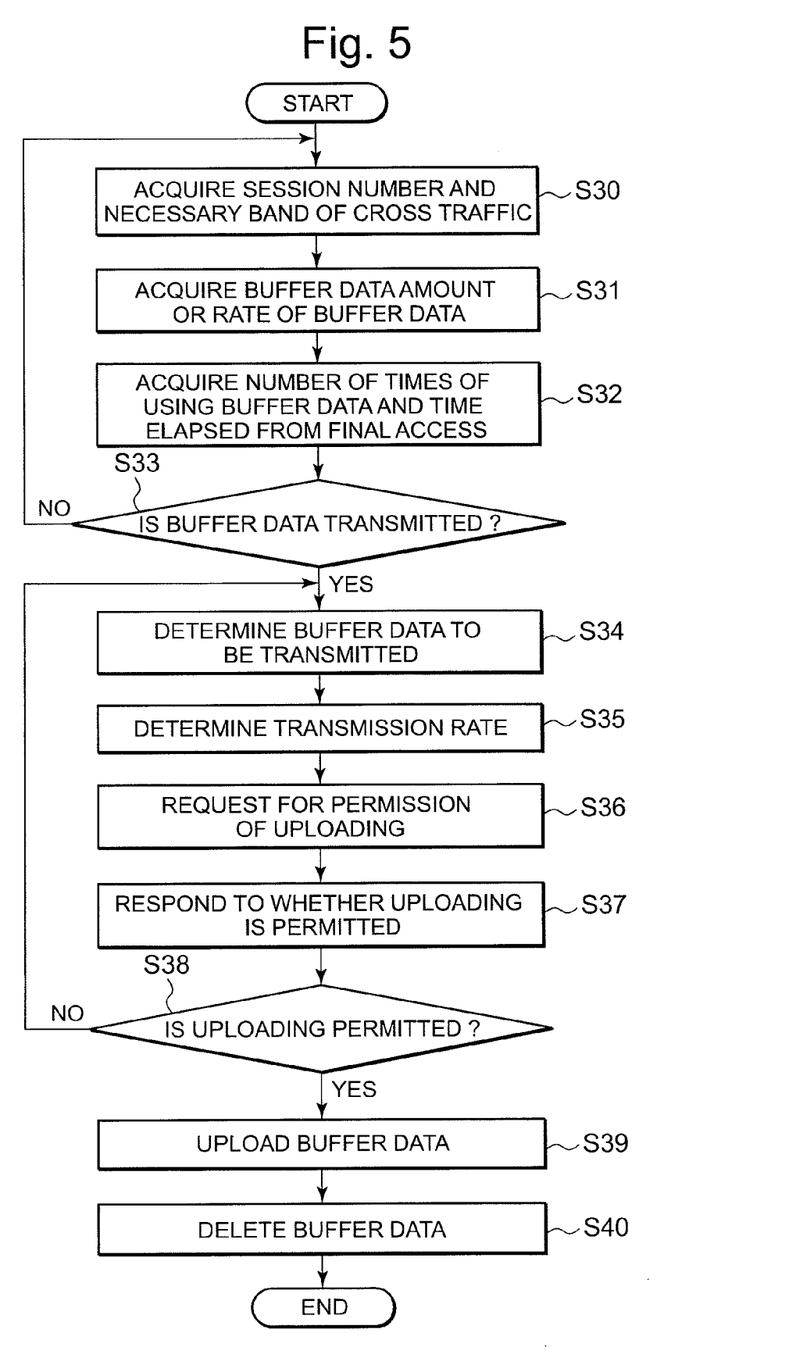
FIG. 5 is a flowchart showing an operation of transmitting data which are formed and updated by a user to a storage device by a cache device according to an illustrative embodiment.

FIG. 5 is a flowchart showing an operation of transmitting the data which is formed and updated by the user to the storage device 3 by the cache device 2.

The uploading control part 22 of the cache device 2 acquires such information as session number and a necessary band of cross traffic from the network state monitoring part 24 at every constant time interval, or when the accumulated control part 21 receives data from the user terminal 1 (step S30). Further, the cross traffic signifies other communication traffic which uses a physical circuit the same as that of a communication between the cache device 2 and the storage device 3 in the network 5.

Further, the uploading control part 22 acquires the data amount of the buffer data which is stored by the data storing part 25, or a rate occupied by the data amount of the buffer data in a total storage capacity of the data storing part 25 (step S31). Further, the uploading control part 23 acquires numbers of times of using respective buffer data which are stored by the data storing part 25 and a time period elapsed from a final access from the access history storing part 26 (step S32). Further, as the number of times of using buffer data, a value of adding a number of times of reading data having a full pass the same as that of the buffer data, a number of times of reading the data, and a number of times of rewriting the data or the like may be used.

Further, the uploading control part 22 determines whether a part or a total of the buffer data which is stored by the data storing part 25 is to be transmitted to the storage device 3 (step S33). Further, the determination of whether the buffer data is to be transmitted is carried out by determining whether the data amount of the buffer data or the rate occupied by the data amount of the buffer data which is acquired at step S31 exceeds a previously set threshold.

In a case where the buffer data stored by the data storing part 25 is determined not to be transmitted (step S33: NO), the uploading control part 22 finishes the processing, and is at standby for execution of determination of uploading at next time.

In a case where the buffer data stored by the data storing part 25 is determined to be transmitted (step S33: YES), the uploading control part 22 determines the buffer data to be transmitted to the storage device 3 (step S34). The determination of the buffer data to be transmitted is carried out by calculating values of dividing the numbers of times of using the buffer data by the time period elapsed from a final access which are acquired at step S32 for respective buffer data and determining the buffer data in which the values become lower than the previously set access threshold as the buffer data to be transmitted to the storage device 3.

Next, the uploading control part 22 determines a transmission rate in transmitting (step S35). In determining the transmission rate, a method of determining the transmission rate to a previously set transmission rate in compliance with the session number of cross traffic which is acquired at step S30 may be used. Specifically, a table relating the session number and the transmission rate is previously stored to the cache device 2, and the transmission rate is determined by reading the session number of cross traffic and referring to the table by the uploading control part 22. Further, the determination of the transmission rate is not limited thereto, but, for example, a method of determining the transmission rate to a value of dividing a band of a communication line between the cache device 2 and the storage device 3 by the session number +1 of the cross traffic, or a method of determining the transmission rate to a value of subtracting a necessary band of each of cross traffic from the band of the communication line between the cache device 2 and the storage device 3 may be used.

Next, the accumulated data control part 21 transmits a request for permission of uploading to the storage device 3 (step S36).

The data transmitting and receiving part 31 of the storage device 3 receives the request for permission of uploading the cache device 2, determines whether the uploading is to be received, and notices a result of the determination to the accumulated data control part 21 (step S37). As a method of determining whether uploading is to be received by the data transmitting and receiving part 31, for example, the following methods are pointed out.

For example, in a case where a session number in writing already to the storage device 3 or a remaining data amount of writing, or a session number in reading already from the storage device 3 or a remaining data amount of reading (hereinafter, a storage load) exceeds a previously set load threshold, the data transmitting and receiving part 31 determines not to receive uploading. On the other hand, there is pointed out a determining method in which in a case where the storage load is lower than the load threshold, the data transmitting and receiving part 31 determines to receive the uploading.

Further, in a case where uploading standby time is lower than a previously set time threshold, the data transmitting and receiving part 31 determines not to receive uploading. On the other hand, there is pointed out a determining method in which in a case where the uploading standby time exceeds the time threshold, the data transmitting and receiving part 31 determines to receive the uploading.

Further, the determining method is not limited to the above-described, but for example, there may be a determining method in which the two determining methods described above are combined, a load threshold which differs in accordance with whether the uploading standby time exceeds the previously set time threshold is set, in a case where the storage load exceeds the load threshold, the uploading is not received, and in a case where the storage load is lower than the load threshold, the uploading is received.

The accumulated data control part 21 of the cache device 2 receives a response of the request for permission of uploading from the storage device 3, and determines whether the uploading has been permitted (step S38). In a case where the response received from the storage device 3 is a response stating that uploading is refused (step S38: NO), the operation returns to step S36, the operation is at standby for a constant period of time or a random period of time, thereafter, transmits a request for permission of uploading to the storage device 3 again.

On the other hand, in a case where the response received from the storage device 3 is a response stating that uploading is permitted (step S38: YES), the accumulated data control part 21 reads the buffer data which is determined at step S34 from the data storing part 25, and transmits the buffer data to the storage device 3 at the transmission rate which is determined at step S35 (step S39). Further, the accumulated data control part 21 deletes the transmitted buffer data from the data storing part 25 (step S40).

Next, an explanation will be given of an effect by the cache system according to the embodiment.

According to the embodiment, in the case where the data to be uploaded is received from the user terminal 1, when the storage capacity of the cache device 2 exceeds the predetermined threshold, the cache device 2 deletes cache data and records buffer data. Thereby, the cache device 2 can achieve high speed formation of updating from the user terminal 1 regardless of the remaining storage capacity of the cache device 2.

Further, according to the embodiment, based on information of a size of cache data stored to the cache device 2, a requested response, a necessary bit rate, a frequency of using buffer data, as well as delay time, a band and the like of the network 5, in a case where the storage capacity of the cache device 2 exceeds the predetermined threshold, it is determined which cache is to be deleted. Thereby, a possibility of deleting data which effects a strong influence to a user by a deterioration in response by a failure in caching from a cache can be reduced.

Further, according to the embodiment, based on information of a data amount of buffer data stored to the cache device 2, a number of times of using the buffer data, the time period elapsed from a final access, as well as loads of the storage device 3 and the network 5 and the like, the determination of whether transmitted data is to be uploaded to the storage device 3, and the transmission rate in uploading are controlled. Thereby, a compression of a cache area by received data can be avoided without applying overload to the storage device 3 or the network 5 by excessively frequent uploading of transmitted data.

Although as described above, the explanation has been given in details of an illustrative embodiment in reference to the drawings, the specific configuration is not limited to the above-described, but various design changes and the like can be carried out within the range not deviated from the gist of illustrative embodiments.

For example, although according to the embodiment, the explanation has been given of the case in which it is determined whether the buffer data is to be transmitted by determining whether the data amount of buffer data or the rate occupied by the data amount of buffer data exceeds the previously set threshold, and buffer data in which a value of dividing a number of times of using buffer data by the time period elapsed from a final access is lower than the previously set access threshold is determined as the buffer data to be transmitted, the present invention is not limited thereto.

For example, in a case where the data amount of buffer data or the rate occupied by the data amount of buffer data exceeds the previously set threshold, all of buffer data stored to the data storing part 25 may be transmitted. Further, for example, buffer data in which a value of dividing simply a number of times of using buffer data by the time period elapsed from a final access is lower than an access threshold may be transmitted.

Further, although according to the embodiment, the explanation has been given of the case where a reduction in a data amount is achieved by deleting cache data from the data storing part 25 in a case where an amount of data recorded to the data storing part 25 is excessively large, the present invention is not limited thereto. For example, by generating cache data having a data amount smaller than that of cache data (small size data) from the cache data and recording the small size data by deleting the original cache data, the reduction in the data amount may be achieved, and the cache data may be left. Further, as small size data, there is pointed out compressed data of cache data, data in which an image quality thereof is lowered in a case where cache data is an image, a data reducing a bit rate in a case where cache data is a time-varying image or a voice or the like. Further, in order to carry out the processing described above, it is necessary that the cache device 2 includes a small size data generating part of generating cache data (small size data) reducing a data amount of the cache data from the cache data which is determined by the deleted cache determining part 23, and a small size data recording part of recording the small size data to the data storing part 25.

The user terminal 1, the cache device 2, and the storage device 3 described above respectively include computer systems at insides thereof. Further, operations of the respective processing parts described above are stored to computer readable record media in a style of programs, and the above-described processings are carried out by reading and executing the programs by the computers. Here, the computer readable record media include a magnetic disk, a magneto-optical disk, CD-ROM, DVD-ROM, a semiconductor memory and the like. Further, the computer program may be delivered to the computer by a communication line, and the computer receiving the delivery may execute the program.

Further, the program may be for realizing a part of the function described above. Further, the program may be a program which can be realized in combination with a program in which the function described above has already been recorded to the computer system, or so-called difference file (difference program).

DESCRIPTION OF REFERENCE NUMERALS

1 ... user terminal, 2 ... cache device, 3 ... storage device, 4 ... local network, 5 ... network, 11 ... data processing part, 21 ... accumulated data control part, 22 ... uploading control part, 23 ... deleted cache determining part, 24 ... network state monitoring part, 25 ... data storing part, 26 ... access history storing part, 31 ... data transmitting and receiving part, 32 ... storing part

[FIG. 1]
1 USER TERMINAL
2 CACHE DEVICE
3 STORAGE DEVICE
11 DATA PROCESSING PART
21 ACCUMULATED DATA CONTROL PART
22 UPLOADING CONTROL PART
23 DELETED CACHE DETERMINING PART
24 NETWORK STATE MONITORING PART
25 DATA STORING PART
26 ACCESS HISTORY STORING PART
31 DATA TRANSMITTING AND RECEIVING PART
32 STORING PART
[FIG. 2]
START
S10 REQUEST FOR DATA TO CACHE DEVICE
S11 IS REQUESTED DATA STORED?
S12 ACQUIRE REQUESTED DATA FROM DATA STORING PART
S13 REQUEST FOR DATA TO STORAGE DEVICE
S14 TRANSMIT REQUESTED DATA TO CACHE DEVICE
S15 IS REQUESTED DATA CACHED?
S16 DATA AMOUNT ADJUSTING PROCESSING
S17 CACHE REQUESTED DATA
S18 TRANSMIT REQUESTED DATA TO USER TERMINAL
S19 PRESENT REQUESTED DATA TO USER
END
[FIG. 3]
DATA AMOUNT ADJUSTING PROCESSING
S100 ADDED DATA+CACHE DATA+BUFFER DATA≥PREDETERMINED THRESHOLD?
S101 ACQUIRE COMMUNICATION DELAY TIME AND BAND

S102 ACQUIRE CACHE DATA SIZE AND FREQUENCY OF USING CACHE DATA
S103 DETERMINE CACHE DATA TO BE DELETED
S104 DELETE THE CACHE DATA
RETURN
[FIG. 4]
START
S20 TRANSMIT DATA TO CACHE DEVICE
S21 IS DATA BEFORE UPDATING STORED?
S22 DELETE BUFFER DATA
S23 DATA AMOUNT ADJUSTING PROCESSING
S24 BUFFER RECEIVED DATA
END
[FIG. 5]
START
S30 ACQUIRE SESSION NUMBER AND NECESSARY BAND OF CROSS TRAFFIC
S31 ACQUIRE BUFFER DATA AMOUNT OR RATE OF BUFFER DATA
S32 ACQUIRE NUMBER OF TIMES OF USING BUFFER DATA AND TIME ELAPSED FROM FINAL ACCESS
S33 IS BUFFER DATA TRANSMITED?
S34 DETERMINE BUFFER DATA TO BE TRANSMITTED
S35 DETERMINE TRANSMISSION RATE
S36 REQUEST FOR PERMISSION OF UPLOADING
S37 RESPOND TO WHETHER UPLOADING IS PERMITTED
S38 IS UPLOADING PERMITTED?
S39 UPLOAD BUFFER DATA
S40 DELETE BUFFER DATA

What is claimed is:

1. A cache device which temporarily stores data transmitted and received between a user terminal and a storage device, the cache device comprising:
    a data recorder which records cache data and buffer data at a storing part,
        wherein the cache data comprises data which is to be stored at the storage device, and
        wherein the buffer data comprises data which is to be written to the storage device;
    a deleted cache determining device which determines the cache data which is to be deleted from the storing part if a sum of a data amount of the data which is recorded at the storing part and a data amount of the cache data which is stored at the storing part and a data amount of the buffer data which is stored at the storing part is equal to or more than a predetermined threshold;
    a cache deleting device which deletes, from the storing part, the cache data which is determined by the deleted cache determining device;
    a buffer transmitter which transmits the buffer data which is stored at the storing part to the storage device;
    a buffer deleting device which deletes, from the storing part, the buffer data which is transmitted by the buffer transmitter; and
    a transmission rate determining device which determines a transmission rate of the buffer data such that the larger the cross traffic number in a network between the storage device and the cache device, the slower the transmission rate;
    wherein the buffer transmitter transmits the buffer data to the storage device at the transmission rate which is determined by the transmission rate determining device.

2. The cache device according to claim 1, further comprising:
    a transmission determining device which determines to transmit the buffer data if the data amount of the buffer data stored at the storing part is equal to or more than the predetermined threshold;
    wherein the buffer transmitter transmits the buffer data to the storage device if the transmission determining device determines to transmit the buffer data.

3. The cache device according to claim 1, further comprising:
    a transmitted buffer determining device which determines the buffer data which is to be transmitted by using information of an access to the buffer data;
    wherein the buffer transmitter transmits the buffer data, which is determined by the transmission buffer determining device to the storage device.

4. The cache device according to claim 1, wherein the deleted cache determining device determines the cache data which is to be deleted based on communication delay time, a band of the network, size of the cache data and a frequency of using the cache data.

5. The cache device according to claim 1, wherein the deleted cache determining device determines the cache data which is to be deleted based on a size of the cache data and/or a frequency of using the cache data.

6. The cache device according to claim 1, further comprising:
    a small size data generating device which generates small size data corresponding to, but smaller in size than, the cache data determined by the deleted cache determining device; and
    a small size data recording device which stores the generated small size data to the storing part.

7. A data management method which uses a cache device for temporarily storing data which is transmitted and received between a user terminal and a storage device, the method comprising:
    recording, by a data recorder, at a storing part, cache data and buffer data;
        wherein the cache data comprises data which is to be stored at the storage device, and
        wherein the buffer data comprises data which is to be written to the storage device;
    determining, by a deleted cache determining device, the cache data which is to be deleted from the storing part if a sum of a data amount of the data which is recorded at the storing part and a data amount of the cache data which is stored at the storing part and a data amount of the buffer data which is stored at the storing part is equal to or more than a predetermined threshold;
    deleting, by a cache deleting device, from the storing part, the cache data which is determined by the deleted cache determining device;
    transmitting, by a buffer transmitter, the buffer data which is stored at the storing part to the storage device;
    deleting, by a buffer deleting device, from the storing part, the buffer data which is transmitted by the buffer transmitter; and
    determining, by a transmission rate determining device, a transmission rate of the buffer data such that the larger the cross traffic number in a network between the storage device and the cache device, the slower the transmission rate;
    wherein the buffer transmitter transmits the buffer data to the storage device at the transmission rate which is determined by the transmission rate determining device.

8. A non-transitory computer readable storage medium storing a program for making a cache device which stores temporarily data transmitted and received between a user terminal and a storage device perform operations comprising:
- recording, by a data recorder, at a storing part, cache data, and buffer data;
  - wherein the cache data comprises data which is to be stored at the storage device, and
  - wherein the buffer data comprises data which is to be written to the storage device;
- determining, by a deleted cache determining device, the cache data which is to be deleted from the storing part if a sum of a data amount of the data which is recorded at the storing part and a data amount of the cache data which is stored at the storing part and a data amount of the buffer data which is stored at the storing part is equal to or more than a predetermined threshold;
- deleting, by a cache deleting device, from the storing part, the cache data which is determined by the deleted cache determining device;
- transmitting, by a buffer transmitter, the buffer data which is stored at the storing part to the storage device;
- deleting, by a buffer deleting device, from the storing part, the buffer data which is transmitted by the buffer transmitter; and
- determining, by a transmission rate determining device, a transmission rate of the buffer data such that the larger the cross traffic number in a network between the storage device and the cache device, the slower the transmission rate;
- wherein the buffer transmitter transmits the buffer data to the storage device at the transmission rate which is determined by the transmission rate determining device.

9. A cache system which comprises a storage device which stores a data, a user terminal which reads data from the storage device and writes data to the storage device, and a cache device which temporarily stores data which is transmitted and received between the user terminal and the storage device;
wherein the cache device comprises:
- a data recorder which records cache data and buffer data at a storing part;
  - wherein the cache data comprises data which is to be stored at the storage device, and
  - wherein the buffer data comprises data which is to be written to the storage device;
- a deleted cache determining device which determines the cache data which is to be deleted from the storing part if a sum of a data amount of the data which is recorded at the storing part and a data amount of the cache data which is stored at the storing part and a data amount of the buffer data which is stored at the storing part is equal to or more than a predetermined threshold;
- a cache deleting device which deletes, from the storing part, the cache data which is determined by the deleted cache determining device;
- a buffer transmitter which transmits the buffer data which is stored at the storing part to the storage device;
- a buffer deleting device which deletes, from the storing part, the buffer data which is transmitted by the buffer transmitter; and
- a transmission rate determining device which determines a transmission rate of the buffer data such that the larger the cross traffic number in a network between the storage device and the cache device, the slower the transmission rate;
- wherein the buffer transmitter transmits the buffer data to the storage device at the transmission rate which is determined by the transmission rate determining device.

* * * * *